(12) United States Patent
Liu

(10) Patent No.: US 8,223,589 B2
(45) Date of Patent: Jul. 17, 2012

(54) GESTURE RECOGNITION APPARATUS AND METHOD

(75) Inventor: Ling-Wei Liu, Taipei Hsien (TW)

(73) Assignees: Hon Hai Precision Industry Co., Ltd., Tu-Cheng, New Taipei (TW); Massachusetts Institute of Technology, Cambridge ( * ) Notice: Subject to any disclaimer, the term of this patent is extended or adjusted under 35 U.S.C. 154(b) by 83 days.

(21) Appl. No.: 12/914,862

(22) Filed: Oct. 28, 2010

(65) Prior Publication Data

US 2012/0106298 A1 May 3, 2012

(51) Int. Cl.
*G01S 15/02* (2006.01)
(52) U.S. Cl. .......................................................... 367/96
(58) Field of Classification Search ................ 367/96; 178/18.04; 345/177
See application file for complete search history.

(56) References Cited

U.S. PATENT DOCUMENTS

| | | | | |
|---|---|---|---|---|
| 6,950,534 B2 * | 9/2005 | Cohen et al. | ................... | 382/103 |
| 7,460,690 B2 * | 12/2008 | Cohen et al. | ................... | 382/103 |
| 7,668,340 B2 * | 2/2010 | Cohen et al. | ................... | 382/103 |
| 2004/0161132 A1 * | 8/2004 | Cohen et al. | ................... | 382/103 |
| 2006/0013440 A1 * | 1/2006 | Cohen et al. | ................... | 382/103 |
| 2008/0281523 A1 * | 11/2008 | Dahl et al. | ........................ | 702/5 |
| 2009/0074248 A1 * | 3/2009 | Cohen et al. | ................... | 382/103 |
| 2010/0296368 A1 * | 11/2010 | Dahl et al. | ..................... | 367/135 |
| 2011/0148798 A1 * | 6/2011 | Dahl | .............................. | 345/173 |
| 2012/0001875 A1 * | 1/2012 | Li et al. | ...................... | 178/18.04 |

\* cited by examiner

*Primary Examiner* — Daniel Pihulic
(74) *Attorney, Agent, or Firm* — Altis Law Group, Inc.

(57) ABSTRACT

The disclosure provides a gesture recognition apparatus and method. The gesture recognition apparatus includes an ultrasound transmitter, an ultrasound receiver, a dividing module, a computing module, a gesture library, and a recognition module. The dividing module is configured to divide reflected ultrasound signals into a plurality of frames according to time intervals. The computing module is configured to obtain an eigenvalue of each frame. The classifying module is configured to filter the eigenvalues to obtain gesture eigenvalues, and to obtain a matrix of probabilities of the gesture eigenvalues. The recognition module is configured to search reference matrices of probabilities from the gesture library for matching with the matrix of probabilities, and to recognize the gesture eigenvalues as a reference gesture corresponding to the reference matrix of probabilities if the reference matrix of probabilities is found.

9 Claims, 2 Drawing Sheets

GESTURE RECOGNITION APPARATUS AND METHOD

BACKGROUND

1. Technical Field

The present disclosure relates to an apparatus that can recognize gestures and method for same.

2. Description of Related Art

Typically, devices capable of recognizing user gestures employ a video camera and image processing software. However, the video camera and image processing software are sensitive to lighting conditions and unintentional movements of the user. Also, problems with hysteresis with responses to user movement are lagging due to the high processing requirements. Therefore, there is room for improvement in the art.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
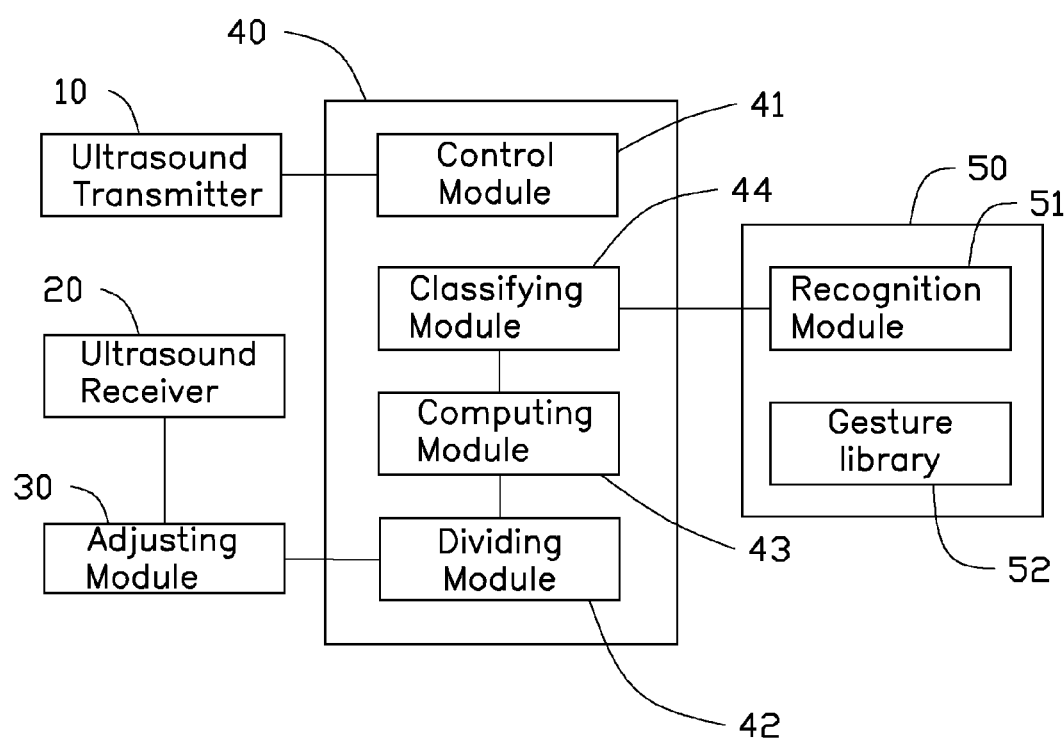
FIG. 1 is a schematic view of a gesture recognition apparatus of an embodiment.

Referring to FIG. 1, a gesture recognition apparatus includes an ultrasound transmitter 10, an ultrasound receiver 20, an adjusting module 30, a processing chip 40, and a computer 50.

The adjusting module 30 is configured to filter and amplify a reflected ultrasound signal from the ultrasound receiver 20.

The processing chip 40 includes a control module 41, a dividing module 42, a computing module 43 and a classifying module 44.

The control module 41 is configured to control the ultrasound transmitter 10 to be turned on or off. The dividing module 42 is configured to divide the reflected ultrasound signals into a plurality of frames. The width of each frame is 30 msec. Groups of 30 adjacent frames are defined as a context window. The computing module 43 is configured to obtain an eigenvalue of each frame of each context window. The classifying module 44 is configured to filter the eigenvalues to obtain gesture eigenvalues and obtain a matrix of probabilities of the gesture eigenvalues by using a sound recognition model, such as a hidden Markov model (HMM).

The computer 50 includes a recognition module 51 and a gesture library 52. The gesture library 52 includes a plurality of reference matrixes of probabilities corresponding to a plurality of reference gestures. The recognition module 51 is configured to search the reference matrix of probabilities stored in the gesture library 52 by using a search method, such as a Viterbi search. If the matrix of probabilities from the classifying module 44 matches one of the reference matrix of probabilities then the gesture eigenvalues are recognized as being the gesture associated with that reference matrix of probabilities.

Figure 2:
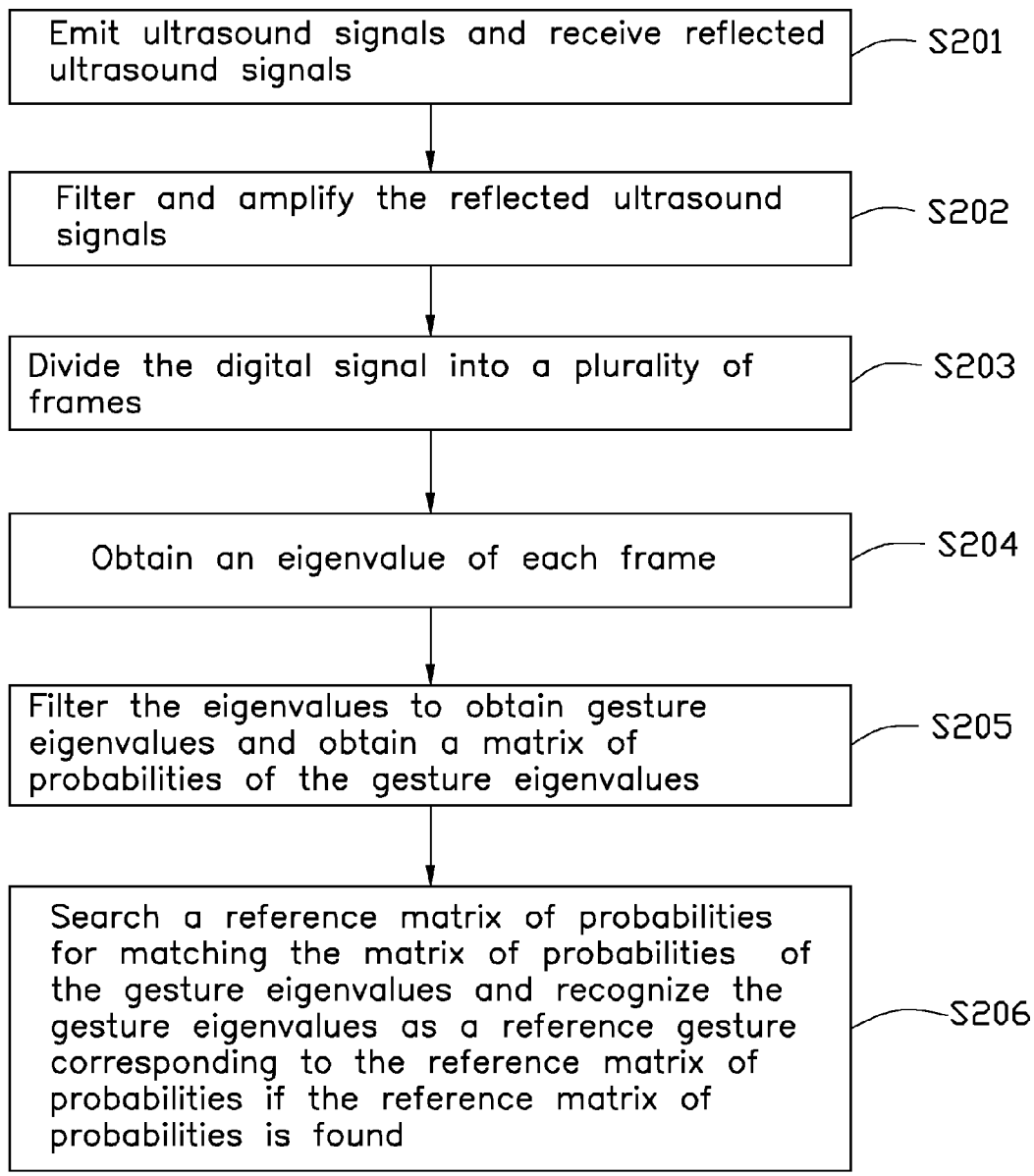
FIG. 2 is a schematic view of a gesture recognition method of an embodiment.

Referring to FIGS. 1 and 2, an embodiment of a gesture recognition method is described below.

S201, the ultrasound transmitter 10 sends ultrasound signals. The ultrasound receiver 20 receives reflected ultrasound signals from an object, such as a hand of a person.

S202, the adjusting module 30 filters and amplifies the reflected ultrasound signals from the ultrasound receiver 20.

S203, the dividing module 42 divides the reflected ultrasound signals into a plurality of frames according to a time interval. Groups of adjacent frames, such as 30 adjacent frames, are defined as context windows.

S204, the computing module 43 obtains an eigenvalue of each frame of each context window.

S205, the classifying module 44 filters the eigenvalues to obtain gesture eigenvalues and obtains a matrix of probabilities of the gesture eigenvalues by using HMM.

S206, the recognition module 61 searches through reference matrices of probabilities from the gesture library 62 for a match with the matrix of probabilities of the gesture eigenvalues by using a Viterbi search; and recognizes the gesture eigenvalues as a reference gesture corresponding to the matching reference matrix of probabilities if one is found.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A gesture recognition apparatus for recognizing a gesture made by a person, comprising:
    an ultrasound transmitter configured to send ultrasound signals;
    a ultrasound receiver configured to receive reflected ultrasound signals from an object;
    a dividing module configured to divide the reflected ultrasound signals into a plurality of frames according to a time interval;
    a computing module configured to obtain an eigenvalue of each frame;
    a classifying module configured to filter the eigenvalues to obtain gesture eigenvalues, and to obtain a matrix of probabilities of the gesture eigenvalues by using a sound recognition model;
    a gesture library comprising a plurality of reference matrixes of probabilities corresponding to a plurality of reference gestures; and
    a recognition module configured to search a reference matrix of probabilities from the gesture library for a match to the matrix of probabilities of the gesture eigenvalues; and recognize the gesture eigenvalues as a reference gesture corresponding to the reference matrix of probabilities if the reference matrix of probabilities is found.

2. The gesture recognition apparatus of claim 1, further comprising an adjusting module configured to filter and amplify the reflected ultrasound signals.

3. The gesture recognition apparatus of claim 1, wherein the sound recognition model is a hidden markov model.

4. The gesture recognition apparatus of claim 1, wherein the recognition module configured to search the reference matrix of probabilities using a Viterbi search.

5. A gesture recognition method for recognizing a gesture made by a person, applied in an apparatus, comprising:
    sending ultrasound signals using a ultrasound transmitter;
    receiving reflected ultrasound signals using a ultrasound receiver;
    dividing the reflected ultrasound signals into a plurality of frames according to a time interval;

obtaining an eigenvalue of each frame;

filtering the eigenvalues to obtain gesture eigenvalues and obtaining a matrix of probabilities of the gesture eigenvalues by using a sound recognition model; and searching a reference matrix of probabilities for a match to the matrix of probabilities of the gesture eigenvalues, and recognizing the gesture eigenvalues as a reference gesture corresponding to the reference matrix of probabilities if the reference matrix of probabilities is found.

6. The gesture recognition method of claim 5, further comprising filtering and amplifying the reflected ultrasound signals before dividing the reflected ultrasound signals.

7. The gesture recognition method of claim 5, wherein the sound recognition model is a hidden markov model.

8. The gesture recognition method of claim 5, wherein searching the reference matrix of probabilities is using a Viterbi search.

9. A gesture recognition method, applied in an apparatus, comprising:

providing an ultrasound transmitter configured to send ultrasound signals; an ultrasound receiver configured to receive reflected ultrasound signals from an object; a dividing module configured to divide the reflected ultrasound signals into a plurality of frames according to a time interval; a computing module configured to obtain an eigenvalue of each frame; a classifying module configured to filter the eigenvalues to obtain gesture eigenvalues and to obtain a matrix of probabilities of the gesture eigenvalues by using a sound recognition model; a gesture library comprising a plurality of reference matrixes of probabilities corresponding to a plurality of reference gestures; and a recognition module configured to search a reference matrix of probabilities from the gesture library for a match to the matrix of probabilities of the gesture eigenvalues; and recognize the gesture eigenvalues as a reference gesture corresponding to the reference matrix of probabilities if the reference matrix of probabilities is found;

sending ultrasound signals using the ultrasound transmitter, and receiving the reflected ultrasound signals using the ultrasound receiver;

dividing the reflected ultrasound signals into the plurality of frames according to the time interval;

obtaining the eigenvalue of each frame;

filtering the eigenvalues to obtain the gesture eigenvalues and obtaining the matrix of probabilities of the gesture eigenvalues by using the sound recognition model;

searching the reference matrix of probabilities for matching with the matrix of probabilities of the gesture eigenvalues, and recognizing the gesture eigenvalues as the reference gesture corresponding to the reference matrix of probabilities if the reference matrix of probabilities is found.

\* \* \* \* \*